April 2, 1935.  A. P. BUSCH  1,996,672
WATER METER
Filed May 29, 1934  3 Sheets-Sheet 1
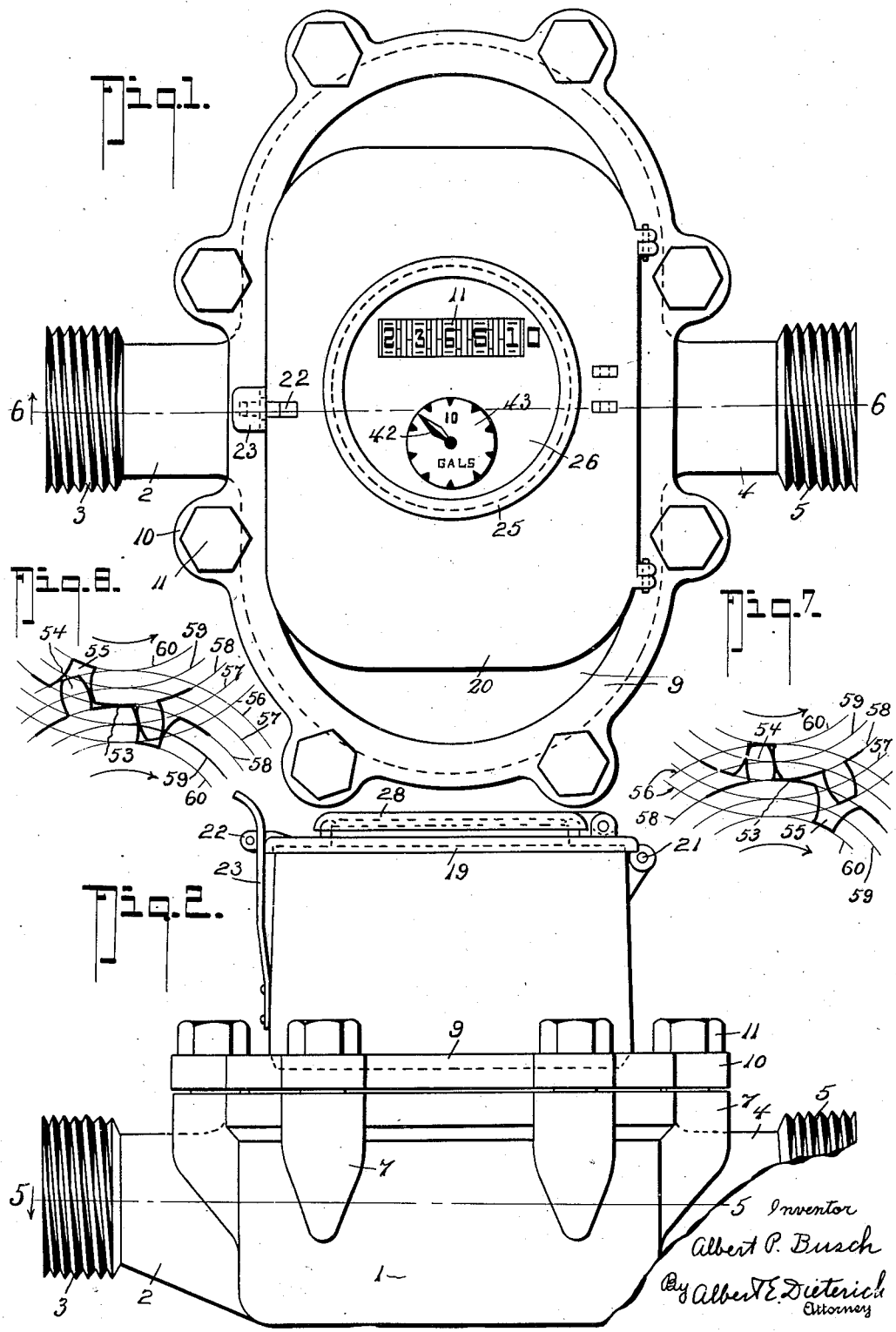

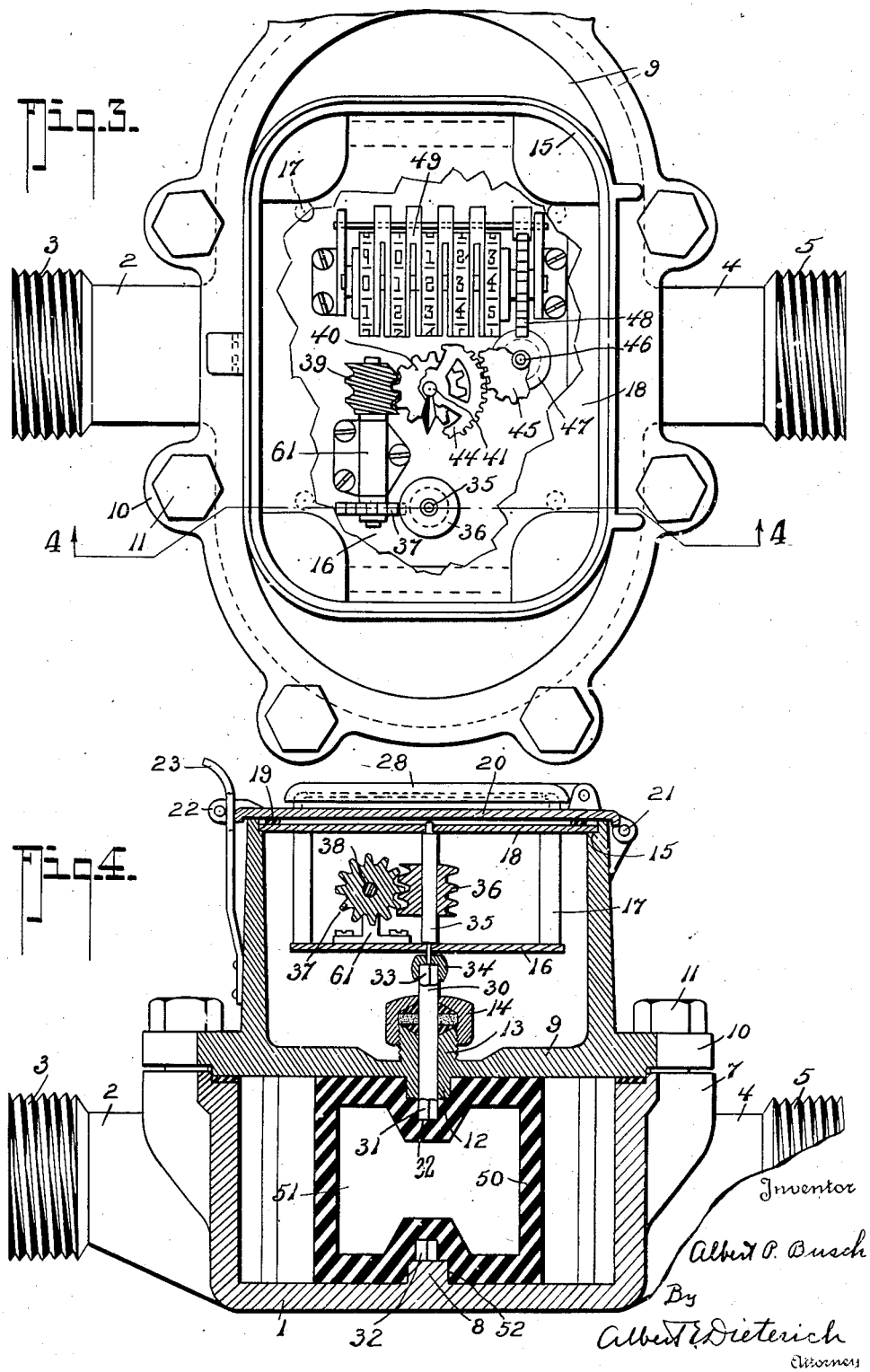

April 2, 1935. A. P. BUSCH 1,996,672
WATER METER
Filed May 29, 1934 3 Sheets-Sheet 3
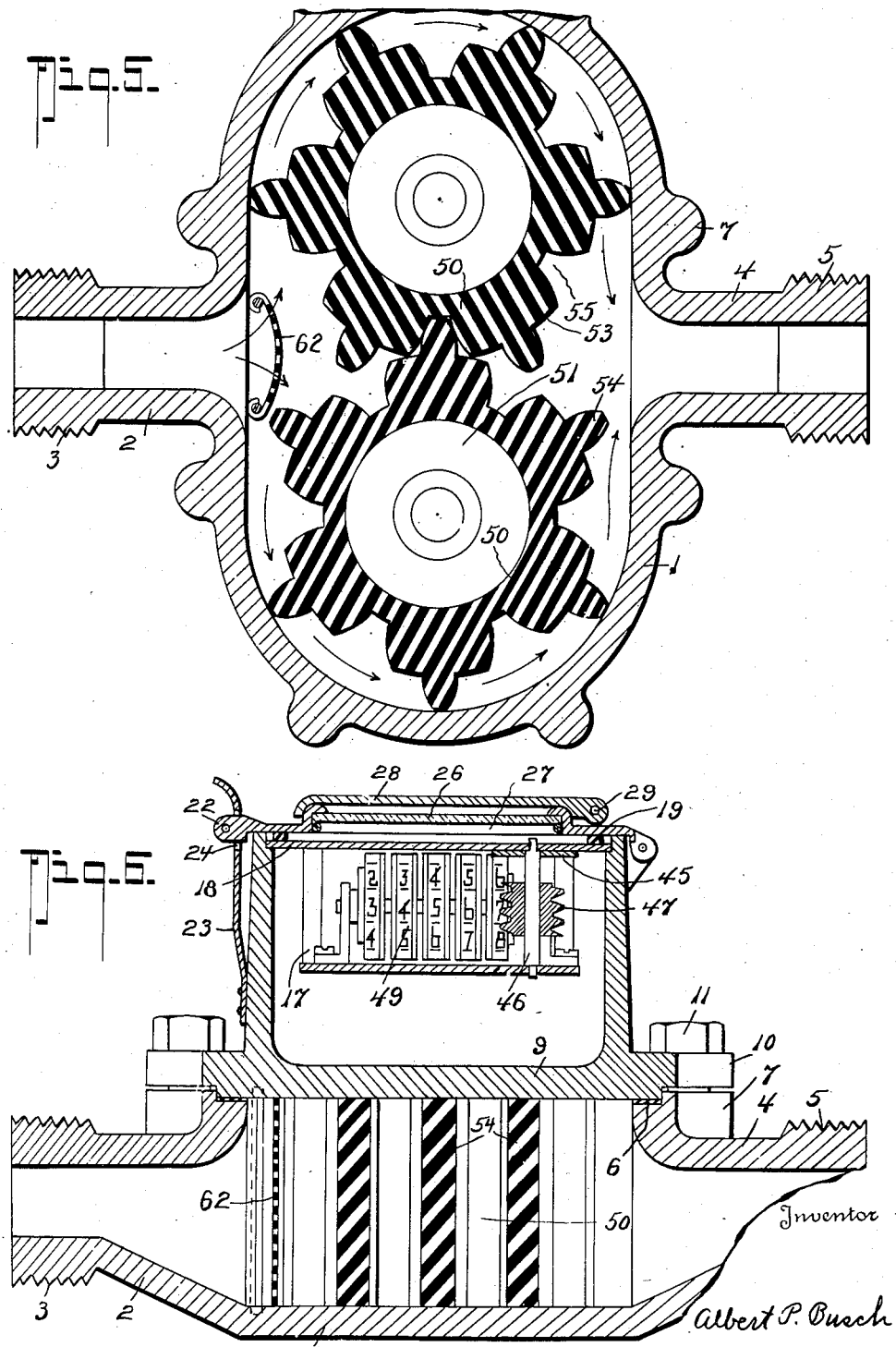

Patented Apr. 2, 1935

1,996,672

UNITED STATES PATENT OFFICE 1,996,672

WATER METER

Albert P. Busch, Nogales, Ariz.

Application May 29, 1934, Serial No. 728,169

4 Claims. (Cl. 73—37)

My invention relates to the class of measuring instruments, and more especially it relates to liquid measuring meters such as are used in measuring the quantity of water flowing through a pipe or conduit.

More specifically the invention relates to improvements in water meters in which a pair of impeller-gears are used, the impeller-gears being of a special design and constituting an important part of the invention.

An object of the invention is to produce a water meter of simple construction using standard counting or registering mechanism in conjunction with my new and improved impeller-gear motor unit.

Further, it is an object to provide a motor unit for operating the register, a unit so constructed and designed as to give positive and maximum displacement and positive performance regardless of tolerable friction which other parts of the machine, such as bearings, shafts and gears, might generate.

Further, it is an object to provide a pair of impeller-gears, in a case, each impeller-gear being of precisely the same size and construction as the other and each consisting of an outer gear and an inner gear, or a gear within a gear; each impeller-gear has an outer pitch circle upon which teeth are cut and an inner pitch circle upon which tooth-spaces are cut, the same being so designed that when placed together a tooth of one impeller-gear will mesh with a space of the other impeller-gear and the next tooth of the second impeller-gear will mesh with a space of the first impeller-gear, and so on alternately, thus performing as ordinary gears.

Further it is an object to provide a meter whose impelling motor consists of two gears in a case, especially designed which when rotated by the flowing water will allow only a certain quantity of water to pass per revolution which results in positive displacement.

Further, it is an object to provide the motor of the meter as meshing gears of the special construction aforesaid in which provision is made whereby the impeller-gears are not only interchangeable but also will be reversible in the case to take up wear and hence increase the effective life of the impeller-gears.

Further, it is an object to provide a meter with a motor of the character aforesaid in which the gears are constructed to be buoyant to a degree sufficient to float them in the case and thus reduce friction and wear of the parts.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, and then be particularly pointed out in the appended claims, reference being had to the accompanying drawings, in which:

Figure 1 is a top plan view of a meter constructed in accordance with my invention, the lid being removed so that the registering dials may clearly be seen.

Figure 2 is a side elevation in full of the meter shown in Figure 1.

Figure 3 is a top plan view of the meter with the cover and the lid removed and the top plate of the registering mechanism unit broken out in order to show the parts beneath.

Figure 4 is a vertical longitudinal section taken on the line 4—4 of Figure 3.

Figure 5 is a horizontal section taken on the line 5—5 of Figure 2.

Figure 6 is a vertical section taken on the line 6—6 of Figure 1.

Figures 7 and 8 are detailed diagrammatic views of a portion of the impeller-gears showing how the teeth and spaces cooperate.

In the drawings in which like numerals of reference indicate like parts in all of the figures, 1 represents the case casting which is provided with an inlet neck 2 and an outlet neck 4, the necks being respectively threaded at 3 and 5 for coupling to the water line.

The case casting is provided with a recess to receive a gasket 6 and in which a portion of the registering mechanism containing casting 9 fits. The casting 1 and the casting 9 are provided with lugs 7 and 10 respectively with which the cap screws 11 cooperate to secure the parts 1 and 9 together. The part 9 is chambered to receive the registering mechanism unit and it also comprises a cover for the casting 1 which comprises the motor chamber.

The casting 1 within the motor chamber is provided with a pair of pivots or bearing studs 8, one for each impeller-gear 50. The casting 9 is also provided with pivots or bearing studs 12 cooperating with the lugs 8.

The stud 12 for one of the impeller-gears is drilled to comprise a bearing for the driving shaft 30. The casting 9 has a stuffing box neck 13 on which is a stuffing box nut 14 to seal the shaft 30 against passage of water through the bearing 12 and neck 13.

The casting 9, as before stated, is chambered to receive the registering mechanism unit, the upper end of the chamber being provided with a seat 15 on which the top plate 18 of the registering mechanism unit lies and against which it is firmly held by resilient strips 19 interposed between the plate 8 and the cover 20 which is hinged at 21 to the casting 9 and is held in place by a spring latch 23 which is slotted as at 24 to fit over the apertured lug 23 on the cover 20, the apertured lug being adapted for the reception of a padlock (not shown). The registering mechanism unit may be of any approved construction. It includes the top plate 18, the bottom plate 16, the spacer rods 17 which are riveted to the plates 16 and 18 and thereby constitute with the plates a rigid holder for the registering works. The cover 20 is provided with a window flange 25 in which is held a glass plate 26 by means of a spring ring 27 (see Figure 6), the window being normally covered by a lid 28 hinged at 29 to the cover 20.

The shaft 30 has its ends squared as at 31 and 33 so that it may be reversible if and when desired, one squared end, say 31, being received in the upper recess 32 of an impeller-gear 50, while the other end, 33, fits into a squared socket of a coupling member 34 carried by the first motor shaft 35 of the registering mechanism unit.

The shaft 35 is mounted in bearings in the plates 16 and 18 and carries a worm 36 which meshes with a worm gear 37 on a shaft 38 rotatable in a bearing 61 mounted on the plate 16. The shaft 38 also carries a worm 39 which in turn meshes with a worm gear 40 on a shaft 41 which comprises the first registering shaft. The shaft 41 is mounted in bearings in the plates 16 and 18 and at its upper end it carries a pointer 42 which cooperates with a dial 43 to indicate up to ten gallons.

On the shaft 41 is a spur gear 44 that meshes with another spur gear 45 on an intermediate shaft 46 which is also mounted in the plates 16 and 18 and carries a worm 47 to mesh with the driving worm gear 48 of the main registering unit 49. The construction of the unit 49 may be that of any well-known registering mechanism adapted for the purpose and per se constitutes no part of the present invention. I therefore consider it unnecessary to illustrate in detail the construction of this unit. Suffice it to say that the unit is made up of a series of registering disks or counters which show the total number of gallons of water passed through the meter.

50 designates the impeller-gears, the construction of which may be best understood by reference to Figures 4 and 5. They comprise bodies hollowed to provide chambers 51 which give buoyancy to the impeller-gears so as to cause them to float, as it were, within the gear chambers and thereby prevent the weight of the impeller-gears from becoming a friction factor in the machine, the outer gear teeth are indicated by the numeral 54 and the inner gear spaces are indicated by the numeral 55.

While I prefer to make the impeller-gears of hard rubber, it is obvious that they may be made of any other material suitable for the purpose. Each impeller-gear has a bearing recess 52 in its top and bottom faces to fit the lugs 8 and 12 respectively regardless of whether the impeller-gear is put in with one face up or down. Each of the bearings 8 and 12 are of the same size, and as all recesses 32 and 52 are of the same size it is obvious that the impeller-gears are interchangeable and reversible.

Each impeller-gear is provided with outer-gear teeth and inner-gear spaces. By reference to Figures 7 and 8 it will be seen that 56 indicates the addendum circle of the outer-gear; 57 indicates the pitch circle of the outer-gear; 58 indicates the whole depth circle of the outer-gear and the addendum circle of the inner-gear which is coincident with the whole depth circle of the outer gear; 59 indicates the pitch circle of the inner-gear; and 60 indicates the whole depth circle of the inner-gear. The teeth and spaces and the cylindrical surfaces at 58 are so designed that there will always be a tooth within a space; thus the two impeller members 50 operate directly as meshing gears and obviate the necessity of providing other means to prevent slippage taking place between the two impeller members or rotors.

62 indicates a screen within the case 1 over the inner end of the inlet neck 2 to protect the rotors against the action of sand and gravel which may be carried in the water stream.

While only one squared recess in the top of one of the impeller-gears is all that is necessary to transmit the revolutions to the registering mechanism, yet at the same time both impeller-gears are recessed in both top and bottom which allows for the interchangeability hereinbefore referred to. It will also be noted that by resting the registering mechanism unit on the seat 15 and holding it in place by means of the cover 20 and resilient strips 19, it is an easy matter to remove the registering mechanism or "works". Simply release the cover 20 from the latch 23 and swing it back on its hinge; this gives access to the registering mechanism unit which may then be lifted out of the chamber of the casing 9 for repairs or replacements if necessary.

As before intimated, the two impeller-gears are alike in every respect—same diameter, same number of teeth, tooth spaces and faces. Of course, it should be understood that a pair of gears of greater diameter and using the same size of tooth would require more teeth and tooth spaces correctly to fit the greater diameter. It is also to be noted that the whole depth line of the outer gear of a member 50 forms the addendum line for the inner gear. The clearance space which all gears must have—or that space between the working depth line and the whole depth line at the meshing point—is to be considered not as leakage. The liquid which enters this clearance space is being constantly thrown back into the inlet chamber or space of the case 1. It is a certain and positive quantity per each revolution of the impeller-gears and is taken care of in the register's calculations.

As before stated, I do not deem it necessary to go into a detailed explanation of the registering mechanism per se, as has been done with the other part of the machine, since no fixed set of gears, worms and worm-gears can be used for all sizes of meters. For example, a pair of impeller-gears of consistent size for a 5/8" water meter, displacing only a fraction of a gallon of water per revolution would require many revolutions in order to register ten gallons for one revolution of the dial pointer on the dial (see Figure 1), in which case the maximum of gears, worms and worm gears would be required in the register.

As a further example, in a large 12" meter, with impeller-gears of consistent size the displacement could be ten gallons per one revolution, in which case the dial pointer of the dial (see Figure 1) would be directly connected to shaft 30 (see Figure 4), thus eliminating some of the gears, worms and worm-gears in the registering unit.

In operation the liquid enters the inlet 2, passes through the screen 62 and as it cannot pass through where the impeller-gears are meshing, it divides to right and left, taking a course on the inside periphery of the case casting 1 and the spaces in between the teeth and on around to the outlet portion. The teeth of the impeller-gears act as obstructions, and as such are impelled around in rotary motion by the flow of the water. Each tooth also acts as a measuring point or, in other words, the quantity of water in between two teeth is a certain and positive amount, which makes for a feature known as positive displacement.

Maximum displacement is another feature because of the way the gears are designed, or, in other words, where the teeth take up a certain amount of water space, this is balanced by the tooth space of the inner gear. Still another feature of the invention is positive performance; in other words, the water cannot pass around without rotating the gears. As before indicated, the movement of the impeller-gears is made through the shaft 30 to the registering mechanism to operate the same, as will be clearly understood by reference to the drawings.

From the foregoing description, taken in connection with the accompanying drawings, it is thought that the construction, operation and advantages of the invention will be clear to those skilled in the art to which it appertains.

What I claim is:

1. In a water meter having a registering mechanism, a water-flow operated motor to actuate said mechanism and comprising a case having a water inlet and a water outlet adapted to be connected in a water line, a pair of impeller-gears rotatably mounted in said case, an operating connection between one of said impeller-gears and the registering mechanism, each impeller-gear being a duplicate of the other and each comprising an inner-gear and an outer-gear, the whole depth circle of each outer-gear coinciding with the addendum circle of the inner-gear, the inner-gear of one impeller-gear having spaces to receive the teeth of the outer-gear of the other impeller-gear, the case having its ends curved to conform to the addenda circles of the outer-gears of the impeller-gears, the inlet and outlet for the water in said case being located one at one side and the other at the other side of the plane containing the axes of the two impeller-gears, the teeth of the outer gear being of the spur gear type and having their side faces symmetrically arranged and having their outer faces of sufficient width to provide a surface contact with the case, the teeth of each outer gear having rolling contact with the walls of the inner gear with which they engage.

2. In a water meter having a registering mechanism, a water-flow operated motor to actuate said mechanism and comprising a case having a water inlet and a water outlet adapted to be connected in a water line, a pair of impeller-gears rotatably mounted in said case, an operating connection between one of said impeller-gears and the registering mechanism, each impeller-gear being a duplicate of the other and each comprising an inner gear and an outer-gear, the whole depth circle of each outer-gear coinciding with the addendum circle of the inner-gear, the inner-gear of one impeller-gear having spaces to receive the teeth of the outer-gear of the other impeller-gear, the case having its ends curved to conform to the addenda circles of the outer-gears of the impeller-gears, the inlet and outlet for the water in said case being located one at one side and the other at the other side of the plane containing the axes of the two impeller-gears, each of said impeller-gears being hollow to render the same buoyant, the teeth of the outer gear being of the spur gear type and having their side faces symmetrically arranged and having their outer faces of sufficient width to provide a surface contact with the case, the teeth of each outer gear having rolling contact with the walls of the inner gear with which they engage.

3. In a water meter having a registering mechanism, a water-flow operated motor to actuate said mechanism and comprising a case having a water inlet and a water outlet adapted to be connected in a water line, a pair of impeller-gears rotatably mounted in said case, an operating connection between one of said impeller-gears and the registering mechanism, each impeller-gear being a duplicate of the other and each comprising an inner-gear and an outer-gear, the whole depth circle of each outer-gear coinciding with the addedum circle of the inner-gear, the inner-gear of one impeller-gear having spaces to receive the teeth of the outer-gear of the other impeller-gear, the case having its ends curved to conform to the addenda circles of the outer-gears of the impeller-gears, the inlet and outlet for the water in said case being located one at one side and the other at the other side of the plane containing the axes of the two impeller-gears, each impeller-gear being provided in its top and bottom faces with like bearing recesses and squared shaft sockets for purposes described, the teeth of the outer gear being of the spur gear type and having their side faces symmetrically arranged and having their outer faces of sufficient width to provide a surface contact with the case, the teeth of each outer gear having rolling contact with the walls of the inner gear with which they engage.

4. In a water meter having a registering mechanism, a water-flow operated motor to actuate said mechanism and comprising a case having a water inlet and a water outlet adapted to be connected in a water line, a pair of impeller-gears rotatably mounted in said case, an operating connection between one of said impeller-gears and the registering mechanism, each impeller-gear being a duplicate of the other and each comprising an inner-gear and an outer gear, the whole depth circle of each outer-gear coinciding with the addendum circle of the inner-gear, the inner-gear of one impeller-gear having spaces to receive the teeth of the outer-gear of the other impeller-gear, the case having its ends curved to conform to the addenda circles of the outer-gears of the impeller-gears, the inlet and outlet for the water in said case being located one at one side and the other at the other side of the plane containing the axes of the two impeller-gears, each of said impeller-gears being hollow to render the same buoyant, and each impeller-gear being provided in its top and bottom faces with like bearing recesses and squared shaft sockets for purposes described, the teeth of the outer gear being of the spur gear type and having their side faces symmetrically arranged and having their outer faces of sufficient width to provide a surface contact with the case, the teeth of each outer gear having rolling contact with the walls of the inner gear with which they engage.

ALBERT P. BUSCH.